(12) United States Patent
Sarferaz et al.

(10) Patent No.: US 8,869,170 B2
(45) Date of Patent: Oct. 21, 2014

(54) SYSTEM AND METHOD FOR A PROCESS BROKER AND BACKEND ADAPTER BASED PROCESS INTEGRATION

(75) Inventors: Siar Sarferaz, Speyer (DE); Markus Peter, St. Leon-Rot (DE); Bernd Schmitt, Waldbronn (DE); Volker Wiechers, Neckargemund (DE)

(73) Assignee: SAP SE, Walldorf (DE)

( * ) Notice: Subject to any disclaimer, the term of this patent is extended or adjusted under 35 U.S.C. 154(b) by 246 days.

(21) Appl. No.: 12/956,816

(22) Filed: Nov. 30, 2010

(65) Prior Publication Data

US 2012/0137306 A1 May 31, 2012

(51) Int. Cl.
*G06F 9/46* (2006.01)
*G06Q 10/10* (2012.01)

(52) U.S. Cl.
CPC .................................. *G06Q 10/10* (2013.01)
USPC .......................................... 719/315; 719/330

(58) Field of Classification Search
None
See application file for complete search history.

(56) References Cited

U.S. PATENT DOCUMENTS

| | | | |
|---|---|---|---|
| 6,208,345 B1 | 3/2001 | Sheard et al. | |
| 6,256,676 B1 | 7/2001 | Taylor et al. | |
| 6,453,356 B1* | 9/2002 | Sheard et al. | 709/231 |
| 7,752,293 B1 | 7/2010 | Bishop, Jr. et al. | |
| 2003/0018832 A1 | 1/2003 | Amirisetty et al. | |
| 2003/0084056 A1* | 5/2003 | DeAnna et al. | 707/100 |
| 2003/0093403 A1 | 5/2003 | Upton | |
| 2003/0093479 A1 | 5/2003 | Mellen-Garnett et al. | |
| 2003/0093575 A1* | 5/2003 | Upton | 709/310 |
| 2003/0172368 A1* | 9/2003 | Alumbaugh et al. | 717/106 |
| 2004/0019693 A1* | 1/2004 | Grow et al. | 709/232 |
| 2004/0117428 A1 | 6/2004 | Surma et al. | |
| 2004/0192205 A1 | 9/2004 | Bagsby | |
| 2005/0015619 A1* | 1/2005 | Lee | 713/201 |
| 2006/0007466 A1* | 1/2006 | Ben-Yehuda et al. | 358/1.13 |
| 2006/0133412 A1* | 6/2006 | Callaghan | 370/465 |
| 2006/0136601 A1* | 6/2006 | Arora et al. | 709/246 |
| 2007/0011126 A1 | 1/2007 | Conner et al. | |
| 2007/0011332 A1 | 1/2007 | Raghavan et al. | |
| 2007/0185746 A1* | 8/2007 | Chieu et al. | 705/7 |
| 2007/0265862 A1 | 11/2007 | Freund et al. | |
| 2008/0082569 A1 | 4/2008 | Mansour et al. | |
| 2008/0126110 A1 | 5/2008 | Haeberle et al. | |
| 2008/0189438 A1 | 8/2008 | Zimmerer et al. | |

OTHER PUBLICATIONS

"How to Set Up the Communication between ABAP Backend and SOAP Adapter using XI Protocol" by SAP How-To Guide. Published Oct. 2009. (http://www.sdn.sap.com/irj/scn/go/portal/prtroot/docs/library/uuid/70066f78-7794-2c10-2e8c-cb967cef407b?quicklink=index&overridelayout=true).*

* cited by examiner

*Primary Examiner* — Tuan Dao
*Assistant Examiner* — Shih-Wei Kraft
(74) *Attorney, Agent, or Firm* — Kenyon & Kenyon LLP (57) ABSTRACT

Embodiments of the present invention may provide a local process integration component to facilitate process integration. The local process integration component may include an adapter, a process broker and a process broker handler. The process broker may collaborate with the business logic and adapter to perform business-centric integration logic. The architecture is based on is a toolkit and generator approach. For inbound communication, the adapter is responsible for control flow while the process broker handler provides generic services. For outbound communication, the process broker is responsible for control flow while the process broker handler provides generic services. The control flow orchestration is uniformed by code generation.

13 Claims, 10 Drawing Sheets

SYSTEM AND METHOD FOR A PROCESS BROKER AND BACKEND ADAPTER BASED PROCESS INTEGRATION

FIELD

The disclosed subject matter relates to the field of computer systems and, more particularly, to a system and method for providing a process integration based on process brokers and backend adapters.

BACKGROUND

Modern enterprises typically use a lot of software systems in a system landscape. In most current system landscapes, many components are directly connected in a point-to-point connection. To facilitate communications, interfaces are developed between two systems so that a sender system can send a document to a receiver system via an interface. Those interfaces typically are hardwired into the application components and individual mappings programs. Because interfaces are required between any two systems, the growth of the number of computer systems results in a complicated network of connections. Under these conditions, managing the collaborative sharing of information is difficult. Therefore, companies face an increasing need for integration of and collaboration among their information and enterprise software systems.

Process integration has been implemented to provide a solution to this increasing need. Process integration typically relies on central application servers to deal with the interplay between intra- and inter-component processes of different systems regarding modeling, transaction management, configuration, monitoring and extensibility. These central application servers, for example, (Enterprise Application Integration hubs) are connected to all systems in a system landscape, and route the exchanged messages between different systems and map the messages between the systems' formats. The communication with the central application servers is typically implemented in a message exchange framework based on SOAP/XML technology. The message exchange framework provides a platform that allows different interfaces to communicate using a uniform technology and promotes overall clarity and reduces maintenance effort. This central hub approach has several shortcomings. First, the hubs can only route a message based on the information contained in the message. Frequently, the messages don't contain enough information for correct routing decisions. Second, a source message can only be mapped into a target message format if it already contains all required information, which often is not the case as well. As a result, the sender system interfaces/messages often still have to be adapted for each receiver system Furthermore, customers keep complaining about high total cost of ownership (TCO) and high total cost of development (TCD) in operations of a process integration product. The main reason for the complaints is that the current application servers provided by software venders have severe limitations. For example, current application servers typically lack programming model and infrastructure for remote and peer-to-peer communication that provides uniform support for all communication channels, for managing the state of conversations with remote components, or for monitoring and error handling. Further, the existing infrastructure only provides disparate solutions for some of these capabilities for some channels and gaps are closed by patch solutions.

Moreover, the business and integration logic is often closely interwoven such that adapting to a new integration process often requires significant changes to the core business logic as well. This leads to a higher TCD for process integration in general and the absence of a unified approach across all applications results in a proliferation of tools and configuration environments, which increases TCO considerably and inhibits scenario-driven configuration. The typical solution to separate business and integration logic uses a framework driven control flow, in which application logic is implemented in business objects and the framework calls on the business objects to perform various functions. However, the drawback of a framework approach is that any logic that does not fit into the predefined framework logic either requires a modification to the framework itself or some "creative" code to lever the limitations of the framework. As the framework drives the application, it has to have a deep knowledge on how applications are built, which contradicts the separation of concerns if the framework and applications are developed by different organizations. This also complicates the enhancement of the framework if adoptions to unforeseen use cases must be supported by the framework. Further, the hidden control logic makes it harder for untrained developers, supporters or customers to understand the overall logic.

Therefore, there is a need for a system and method that provides a communication mechanism that separates business and integration logic and reduces the cost of adding new communication channels.

DETAILED DESCRIPTION

Embodiments of the present invention may provide a local process integration component to facilitate process integration. The local process integration component may include an adapter, a process broker and a process broker handler. The process broker may collaborate with the business logic to perform business-centric integration logic (e.g. to decide when integration is necessary), and with adapters for interface mapping. The framework is based on a toolkit and generator approach. For inbound communication, the adapter is responsible for control flow while the process broker handler provides generic services. For outbound communication, the process broker is responsible for control flow while the process broker handler provides generic services. The control flow orchestration is uniformed by code generation.

Figure 1:
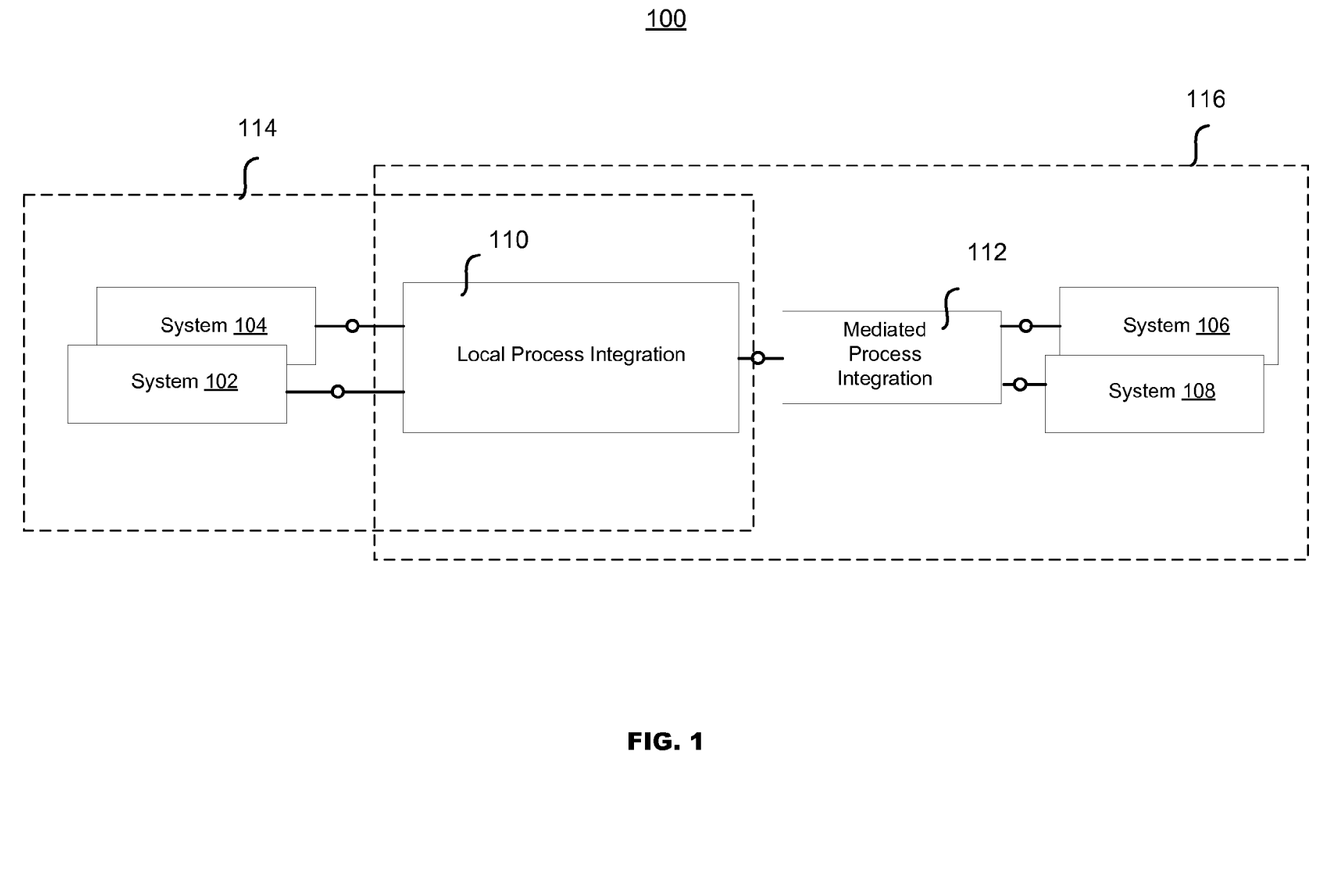
FIG. 1 illustrates an exemplary process integration system landscape according to an embodiment.

FIG. 1 illustrates an exemplary system landscape 100 according to an embodiment. The system landscape 100 may comprise a plurality of systems 102, 104, 106 and 108. The systems 102, 104, 106 and 108 may run applications from different software vendors and provide different services (e.g., data storage, document storage, report generation, customer relationship management). The systems 102 and 104 may be integrated in a point-to-point integration 114 using a local process integration component 110. The systems 106 and 108 may be integrated in a mediated integration 116 using a mediated process integration hub 112. Via the mediated process integration hub 112, the systems 102 and 104 may also be integrated with the systems 106 and/or 108.

In one embodiment, the local process integration component 110 may be implemented as part of a communication stack of an application server. Accordingly, communication messages between the sender and receiver may conform to a protocol defined by the local process integration component 110. Thus, any systems that run the application with the local process integration component 110 may communicate with each other in a point-to-point manner. The mediated process integration hub 112 may be a full process integration hub (e.g., middleware like SAP NetWeaver Process Integration) including message translation to facilitate communication between diverse systems.

Figure 2:
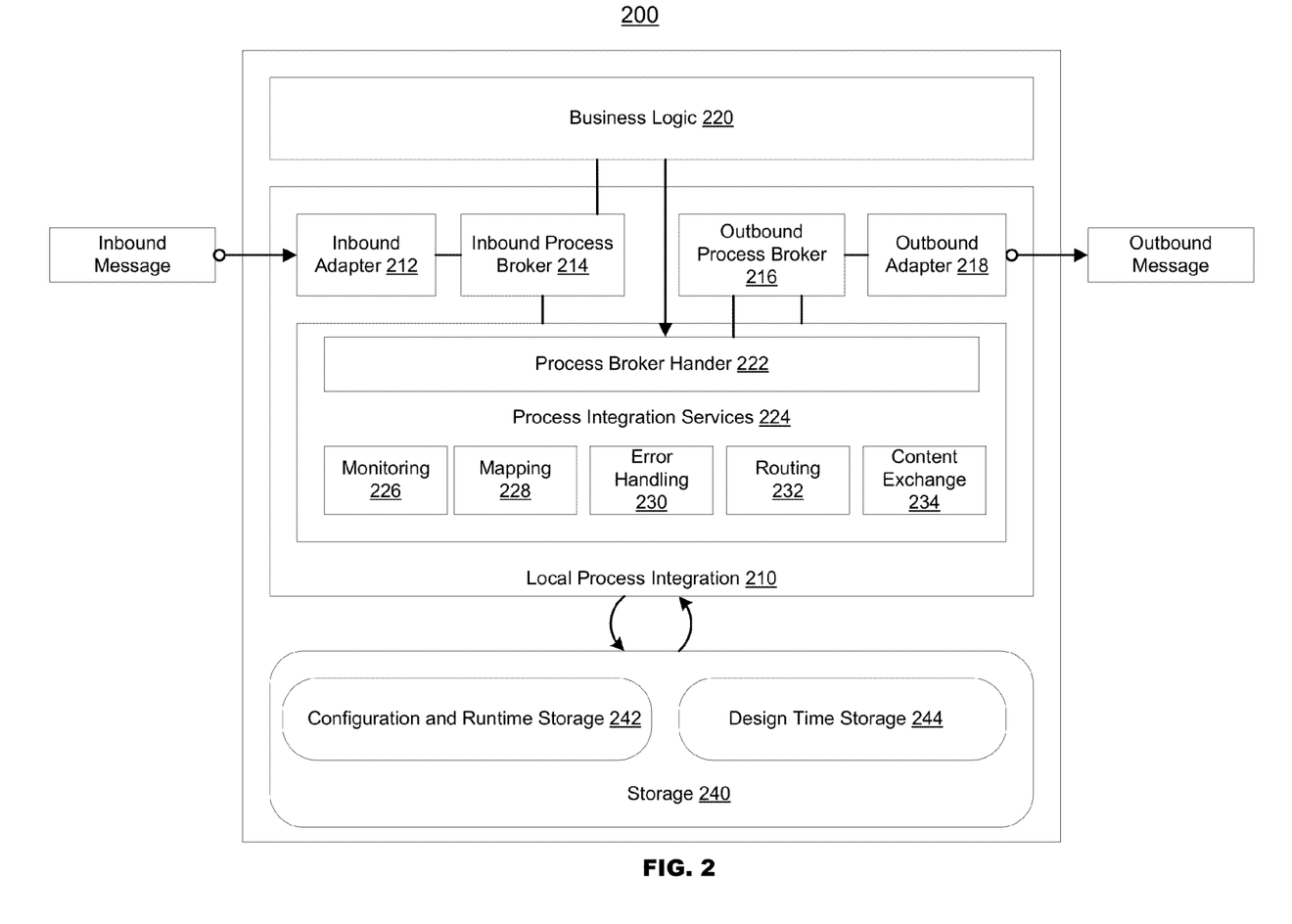
FIG. 2 illustrates a block diagram of an exemplary system according to an embodiment.

FIG. 2 illustrates a block diagram of an exemplary system 200 according to an embodiment. The system 200 may comprise a local process integration 210, business logic 220 and a storage 240. The local process integration 210 may comprise an inbound adapter 212, an inbound process broker 214, an outbound process broker 216, an outbound adapter 218 and process integration services 224. The process integration services 224 may comprise a process broker handler 222 and a plurality of process integration services: monitoring service 226, mapping service 228, error handling service 230, routing service 232 and content exchange service 234. The storage 240 may comprise a configuration and runtime storage 242 and a design time storage 244.

The system 200 may receive an inbound message by the inbound adapter 212 and send an outbound message by the outbound adapter 218. The adapters 212 and 218 may provide or consume remote interfaces of the communication technologies and with the signatures needed to be callable by (e.g., for inbound) or call (e.g., for outbound) different external applications. For example, an adapter may expose a concrete remote function call (RFC) or Enterprise Service interface or use a corresponding client proxy. Adapters may implement the logic to assemble or dissemble the messages for remote communication into the input/output provided/expected by associated Process Brokers. For example, the inbound adapter 212 may take care of de-serializing received messages that have been transmitted in channel-specific ways and the outbound adapter 218 may take care of serializing messages and transmit them in channel-specific ways. Accordingly, the adapters may implement technology-/signature-centric integration logic.

Process brokers 214 and 216 may contain the business-centric integration logic. In case of inbound communication, the inbound process broker 214 may define a local, coarse grained interface to perform the actions within the application required for the integration case it is responsible for. The inbound process broker 214 may implement these actions by calling the business logic 220. The inbound process broker 214 may also delegate handling business errors and conflicts as well as managing the state of the ongoing conversation to the process broker handler 222. The inbound process broker 214 thus may be the single entity that knows how to orchestrate the business logic to achieve the desired business result. The associated inbound adapter 212 may wrap the inbound process broker 214 and expose the services provided by the business logic to other systems.

In one embodiment, the synchronous outbound communication may be implemented differently from the asynchronous outbound communication. For synchronous outbound communication, the business logic 220 may define a local interface containing the parameters needed for the remote process to be called, and the parameters it expects in return. The outbound process broker 216 may implement the interface. The business logic 220 then may call the outbound process broker 216 at the appropriate time and code point. Accordingly, part of the process integration logic thus may reside in the business logic 220: the decision where/when to integrate. The outbound process broker 216 may "route" the call (who to communicate with) to use appropriate adapter(s) (e.g., the outbound adapter 218 or other outbound adapters not shown), consolidate the result if multiple adapters are called, and decide if communication errors can be tolerated from a business perspective. The involved adapter(s) may also implement the interface defined by the business logic 220.

In case of asynchronous outbound communication, the business logic 220 does not trigger the outbound process broker 216. Instead, when a transaction is about to be completed, the infrastructure generates a generic event that triggers the process broker handler 222. The event may contain the information modified in the current transaction (e.g., Business Object (BO) instances being modified) and values of their Status & Action Management (S&AM) status variables. The process broker handler 222 may call any brokers (e.g., outbound process broker 216) subscribed to this event for selected BO types and status values, and calls them passing references to the modified BO instances. Each broker (e.g., outbound process broker 216) may translate the event into a semantic event from the perspective of its remote process. In other words, each broker may decide whether the BO instance modification mandates communication with the remote process, who runs the latter, and which kind of action to communicate (e.g. create, update or cancel). The broker may use the appropriate adapters (e.g., the outbound adapter 218) for communication, passing references to the modified BO instances. The adapters may use the references to assemble the required messages for remote communication.

In case of asynchronous outbound communication, business logic and process integration logic may be fully separated. Brokers and adapters, however, may retrieve information from the business logic 220 to make their decisions respectively to assemble the messages. The information is not actively passed to them. In one embodiment, passing BO references to the adapters in asynchronous outbound communication has the advantage that message assembly is directly based on the BO data. There is no intermediate "message" structure limiting the information available for message assembly.

The process broker handler 222 may be responsible for instantiating process brokers and adapters. It may also provide (access to) generic services of the process integration services 224 for use in broker and adapter implementations, such as the mapping service 228, error handling service 230, routing service 232 (e.g., who to communicate with), and management of process integration (conversation) state. The process broker handler 222 may also provide receiver and adapter determination services to determine to which address and how to communicate with external systems. The routing service 232 and receiver and adapter determination may be used for a point-to-point communication with other systems as shown in FIG. 1. It should be noted that mediated process integration based on an integration hub can still be used and even a mixture of both options.

The configuration and runtime storage 242 of the storage 240 may store configuration data and integration/conversion data. The design time storage 244 of the storage 240 may store integrated models, broker and adapter registration.

In one embodiment, the architecture shown in FIG. 2 may be complemented with a model-driven development process, resulting in integrated models. These models may be used for a scenario-driven, wizard-based configuration and integration process monitoring. The content exchange service 234 may allow exporting these models, including interface definitions, into an Enterprise Services Repository or full process integration hub, and importing corresponding content (e.g. external service definitions) into an application. The content exchange service 234 may also facilitate shipping remote APIs older systems lack, and deploying them as add-ons to such systems in a customer landscape.

In one embodiment, the business logic 220 may be decoupled from the process integration logic, such that the business logic 220 doesn't have to be touched each time integration logic is to be added, extended, changed or replaced, and such that the business logic 220 doesn't have to be touched each time a new kind of output channel is to be supported. However, the decoupling may not lead to process inconsistencies. When process integration logic is triggered to inform another process instance of a change, the information passed must be consistent with the triggering process or BO instances' state. To ensure both decoupling and consistency, a defined contract between business logic and process integration logic may be required. In one embodiment, since the process brokers' exact responsibilities may depend on the communication direction and whether it is synchronous or asynchronous, the contract may also depend on the same characteristics.

Figure 3:
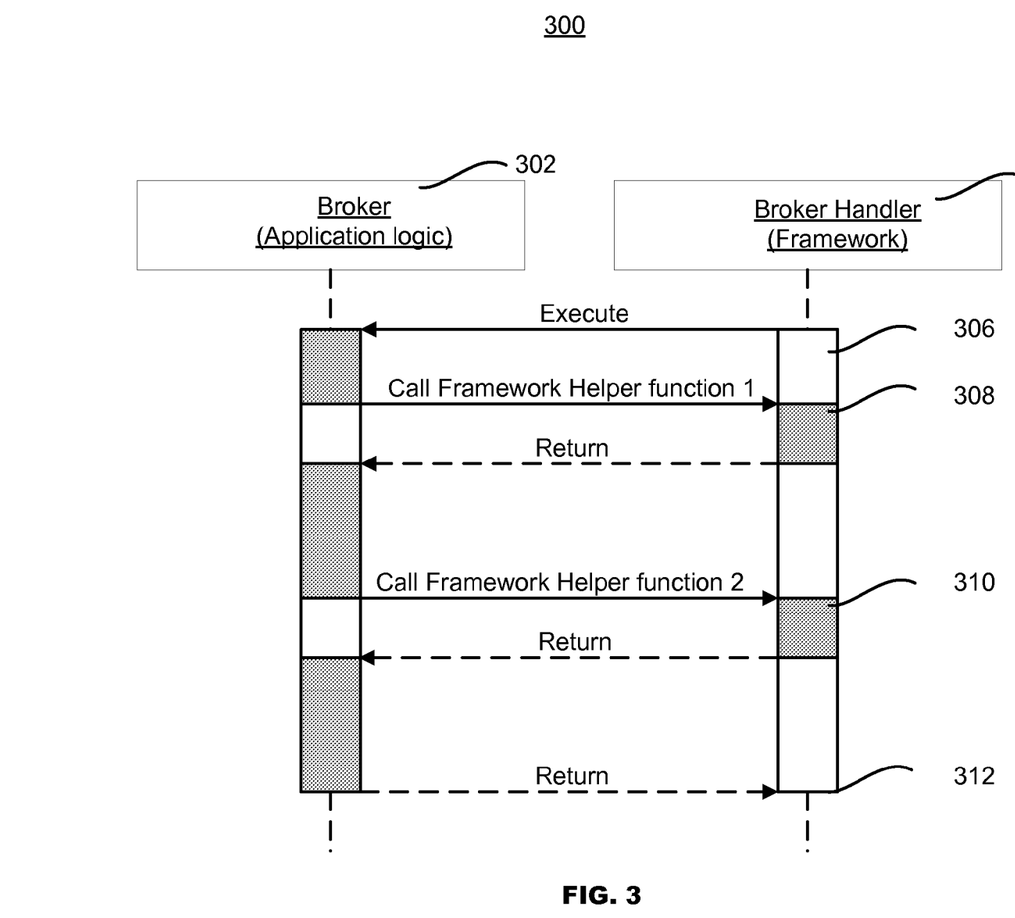
FIG. 3 illustrates a sequence diagram of an exemplary system according to an embodiment.

FIG. 3 illustrates a sequence diagram 300 of an exemplary system according to an embodiment. The sequence diagram 300 may depict a business flow showing interactions of a broker 302 and a broker handler 304. The broker 302 may represent application logic and the broker handler 304 may represent a framework that the application logic is executed in. As shown in FIG. 3, the broker handler 304 may pass the control of the flow to the broker 302 by invoking an execute method at step 306, the broker 302 may take over the flow by calling a framework helper function 1 at step 308 and calling a second framework helper function 2 at step 310. When the broker 302 finishes the process, it may return at step 312.

The sequence diagram 300 may represent an application driven process integration. In situations where the business and integration logic may be closely interwoven, adapting to a new integration process may require changes to the core business logic as well. The sequence diagram 300 may be implemented in a toolkit and generator approach. This approach may be based on three key technologies: a lean and small basic framework; a class library that allows an application developer to communicate with the framework; and a comprehensive development environment that generates code artifacts for common application pattern based on rule templates.

Figure 4:
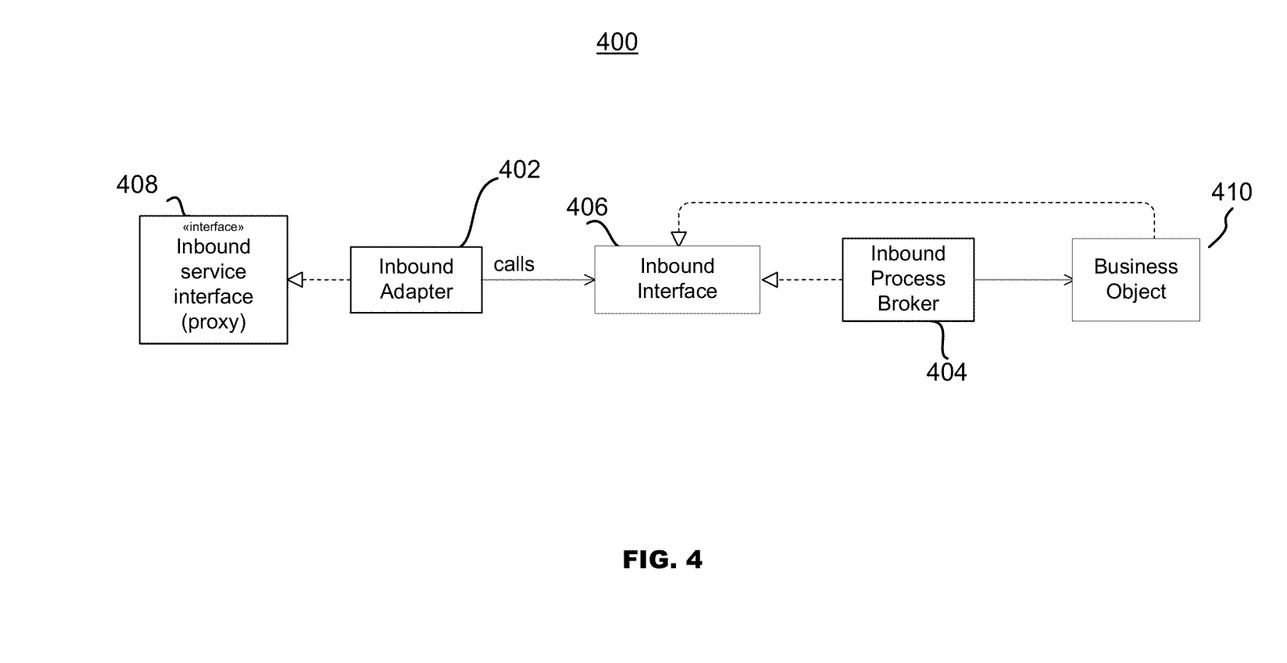
FIG. 4 illustrates a meta model for inbound communication according to an exemplary embodiment.

FIG. 4 illustrates a meta model 400 for inbound communication according to an exemplary embodiment. For inbound communication, the business logic does not have to comply with a process integration specific contract. Inbound process brokers may be seen as equivalent to the User Interface. The business logic may adhere to the standard transaction contract. For example, the business logic may not perform intermediate database updates or cannot define the end of a transaction itself. In addition, the business logic may have to return error information clearly and consistently to the inbound process brokers. This allows the inbound process brokers to react appropriately in case of errors (i.e. rollback, and either return errors to the remote caller or trigger Forward Error Handling in a subsequent logic unit of work (LUW)), and to ensure consistency itself.

The meta model 400 may comprise an inbound service interface 408, an inbound adapter 402, an inbound interface 406, an inbound process broker 404 and a business object 410. The inbound service interface 408 may expose services provided by an application to external systems. Further, the inbound service interface 408 may be remote interfaces of the communication technologies and defined based on communication protocols (e.g., services/SOAP, RFC, Electronic Data Interchange (such as Intermediate Document (IDOC)) and other protocols are provided). The inbound adapter 402 may implement logic to map the protocol specific external message format to the internal interface. The inbound interface 406 may define methods that may perform one or more business processes (e.g., createSalesOrder). The inbound process broker 404 may be a class defined in a corresponding programming language that defines the business logic of the inbound interface 406. The business logic may invoke methods of the business object 410. Further, inbound process broker 404 may perform error handling and process bookkeeping. In one embodiment, the inbound process broker 404 may also handle integration tasks, such as, but not limited to, key mapping, synchronous-asynchronous bridging or other aspects.

In one embodiment, the business object 410 may be implemented in the business logic 220 of the system 200 and represent an example of a plurality of business objects provided in the business logic 220. In another embodiment, the business object 410 may provide interfaces similar to those in service-oriented architecture (SOA) and then the inbound process broker 404 may be simplified (e.g., reduced to error handling and sync-async bridging).

Figure 5:
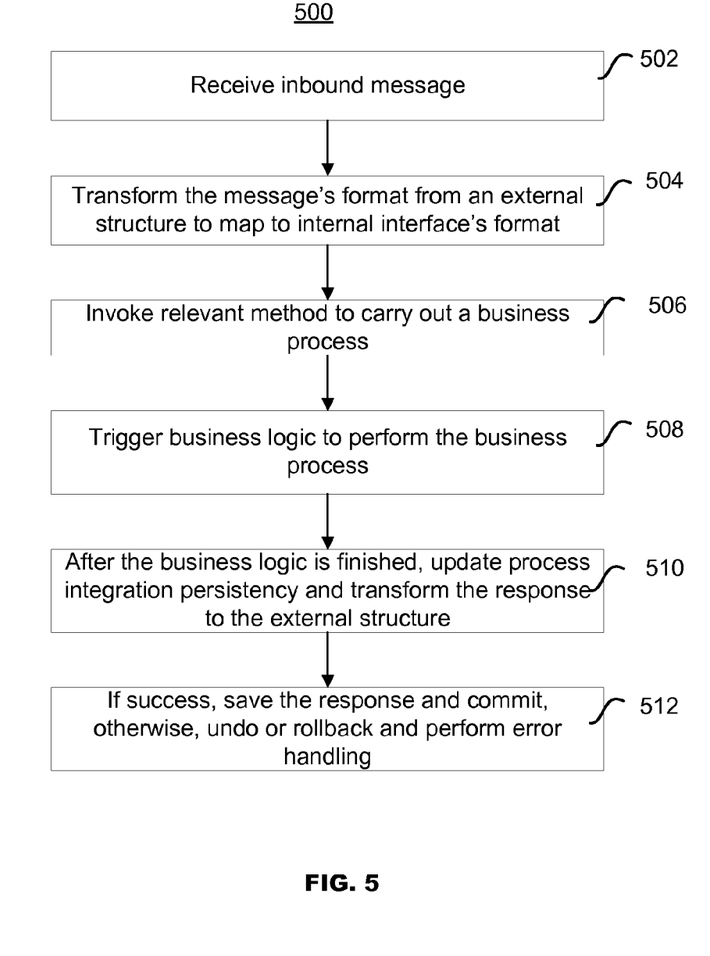
FIG. 5 illustrates a flow chart for inbound processing according to an exemplary embodiment.

FIG. 5 illustrates a flow chart 500 for an inbound communication processing according to an exemplary embodiment. At step 502, an inbound message may be received by a local process integration component. The inbound message may be received by a proxy and handed over by the proxy to a corresponding inbound adapter. The proxy may be provided for SOAP, RFC and IDOC services to ensure type safety and hide complexity regarding protocol specific technical details. The inbound adapter may get an instance of the relevant process broker from a process broker handler. In one embodiment, for asynchronous inbound processing, the inbound adapter may check sequence by checking a sequencing counter (e.g., invoking a checkSequence method implemented by the process broker handler). At step 504, the inbound adapter may transform the message's format from an external structure to map to the internal interface's format. At step 506, the inbound adapter may use the transformed message's request parameter to call a relevant method provided by the relevant process broker to carry out a business process. At step 508, the relevant process broker may trigger business logic to perform the business process (e.g., by actions or business query language (BQL) statements). At step 510, after the business logic is finished, the inbound adapter may update process integration persistency and transform the response to the external structure. Thereafter, at step 512, if the response is generated and transformed successfully, the inbound adapter may save the response and commit, otherwise, the adapter may undo or rollback the previous steps and perform error handling.

Figure 6:
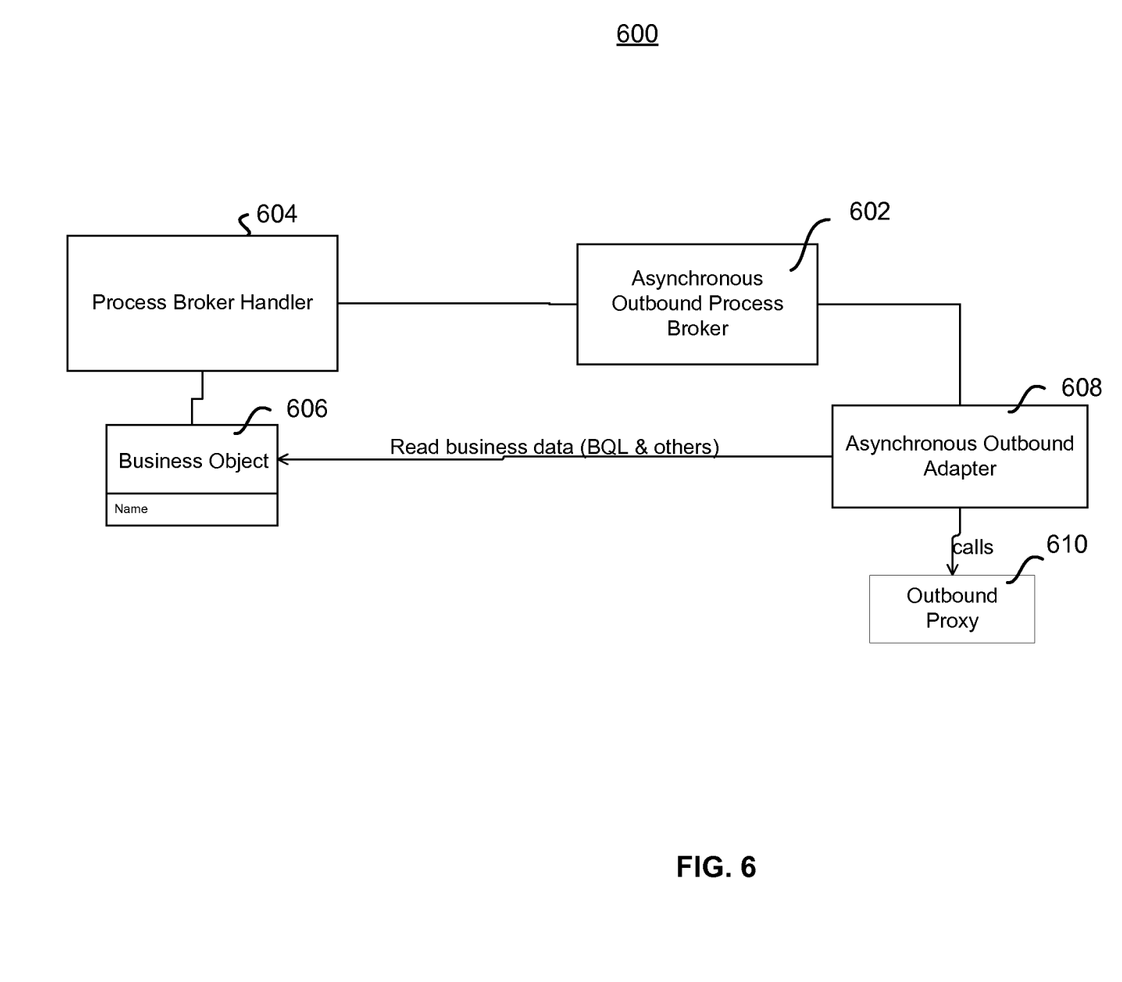
FIG. 6 illustrates a meta model for asynchronous outbound communication according to an exemplary embodiment.

FIG. 6 illustrates a meta model 600 for asynchronous outbound communication according to an exemplary embodiment. For asynchronous outbound communication, a transaction manager in the business logic (e.g., the business logic 220 of FIG. 2) may fire a generic event each time a transaction (or rather logical unit of work) is about to be completed, to trigger outbound process brokers for asynchronous communication. At this point in time, the business logic data may already have been checked without having been written to the database yet. In other words, it may be ensured that the data can be saved to the database, and the data is in its final form with all calculations performed, but everything can still be rolled back to the state before the start of the transaction.

The meta model 600 may comprise an asynchronous outbound process broker 602, a process broker handler 604, a business object 606, an asynchronous outbound adapter 608 and an outbound proxy 610. The asynchronous outbound process broker 602 may represent a plurality of brokers. The asynchronous outbound process broker 602 may register for interested events, for example, status attributes of business objects and save events of the transaction manager. The registration may be saved in a runtime storage (e.g., the configuration and runtime storage 242 of FIG. 2). The process broker handler 604 may listen to the events and changes in the business logic (e.g., status attribute changes of the business objects, and save events of the transaction manager). If one or more of the interested events occurs, the process broker handler 604 may trigger the asynchronous outbound process broker 602. In one embodiment, each asynchronous outbound process broker (e.g., the outbound process broker 602) may implement an interface containing at least an execute method. The process broker handler 604 may call this execute method and pass a transaction handler object as an input parameter. Accordingly, the asynchronous outbound process broker 602 may have access to changes of the current transaction. In one embodiment, status schema may be provided for the business objects that defines transition of status attributes.

The asynchronous outbound process broker 602 may be in charge of "if" and "what" shall be done with respect to process integration. This may include a process relevance check, actor/receiver/operation determination, error handling and process book-keeping. That is, the asynchronous outbound process broker 602 may implement all integration relevant logic that is independent of protocol specifics.

The asynchronous outbound adapter 608 may be responsible for the protocol specifics. All asynchronous outbound adapters implement a coarse grained "self-contained" interface that defines logical methods, e.g. createSalesOrder. The asynchronous outbound adapter 608 may implement this interface and may be called by the asynchronous outbound process broker 602 via the exposed interface. The asynchronous outbound adapter 608 may further implement logic to transform a message from internal to external format. The asynchronous outbound adapter 608 may read additional business logic relevant data directly from the business object 606. The business object 606 may use a transaction handler object or direct BQL statements to database to provide the relevant data. Once the transformation is completed, protocol specific proxies such as the outbound proxy 610 may be called to pass the message to a remote system. In one embodiment, a variety of proxies may be provided for service/SOAP, RFC and IDOC. The proxies may ensure type safety and hide complexity regarding protocol specific technical details.

In one embodiment, in asynchronous outbound communication, the outbound process brokers and adapters may be called in the same LUW, and may have access to both the changed business data as well as the business data as valid on transaction start (before image). This is required for the determination of process integration relevance and message assembly. Knowing the before image may also be required in case of "deferred process integration" (a use case arising in master data replication processes, for example), although this typically requires different data access and recreation of the before image.

In one embodiment, the outbound process brokers and adapters may be responsible for handling communication and process integration errors. For example, if the outbound process broker 602 or the outbound adapter 608 encounter a severe error (system or resource failure, programming error), the entire transaction may be rolled back. If outbound process brokers (e.g., the outbound process broker 602) encounter a missing configuration, the transaction should not be aborted, though, but the assembled message may be stored and a task to resolve the error may be started.

Figure 7:
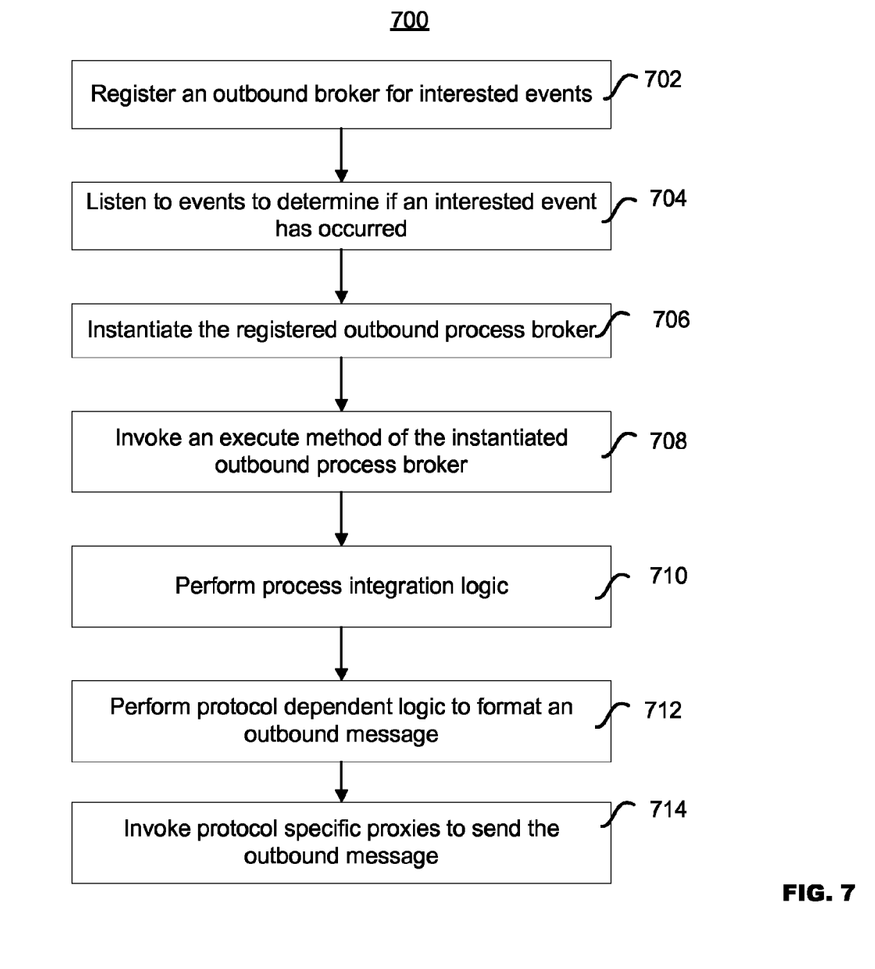
FIG. 7 illustrates a flow chart for asynchronous outbound processing according to an exemplary embodiment.

FIG. 7 illustrates a flow chart 700 for an asynchronous outbound communication processing according to an exemplary embodiment. At block 702, an outbound process broker may register for interested events. At block 704, an outbound process broker handler may listen to events to determine if an interested event has occurred. At block 706, once the process broker handler is notified of occurrence of the interested events, it may instantiate a registered asynchronous outbound process broker. At block 708, the process broker handler may invoke an execute method of the instantiated outbound broker. In one embodiment, a transaction handler may be passed as an input parameter for the execute method.

At block 710, the instantiated outbound process broker may perform process integration logic. The asynchronous outbound process broker may check additional conditions to decide whether an outbound communication shall be performed. Furthermore, it may filter business objects that are relevant for an integration scenario and may determine the technical receivers and relevant adapters. For this, process broker handler may read configuration data for the specific system landscape. In one embodiment, for optimization reasons, process integration persistency may be evaluated, e.g. if a communication to the remote system has already taken place, steps like receiver determination may be skipped.

At block 712, the outbound adapter may be triggered to perform protocol dependent logic to format an outbound message. If for message assembly, additional data are needed, the outbound adapter may access the transaction handler object or directly the database. At block 714, the protocol specific proxies may be used to send the assembled message to remote system(s).

Figure 8:
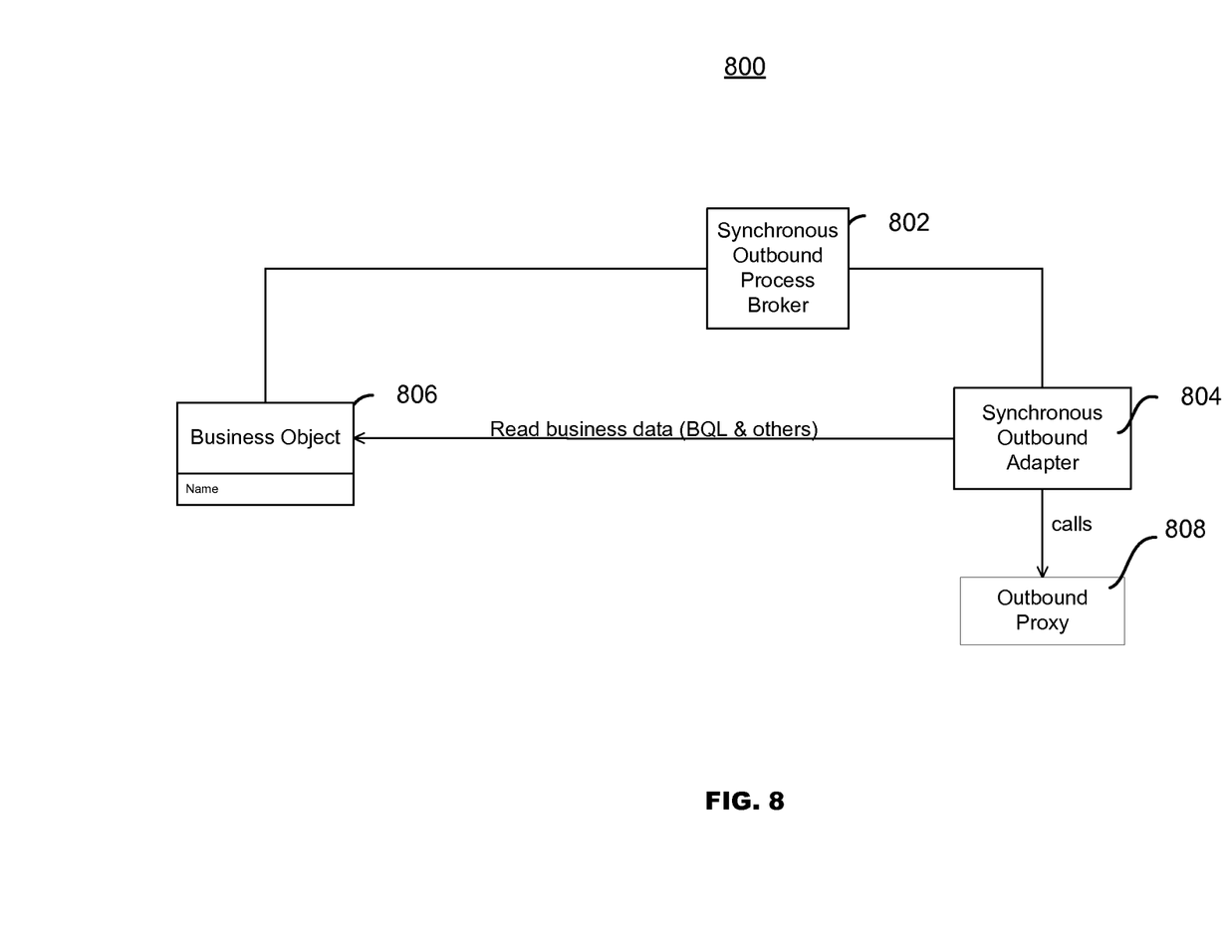
FIG. 8 illustrates a meta model for synchronous outbound communication according to an exemplary embodiment.

FIG. 8 illustrates a meta model 800 for synchronous outbound communication according to an exemplary embodiment. As synchronous calls are bounded close to business logic, explicit calls from business logic are proposed for synchronous outbound communication. The meta model 800 may comprise a synchronous outbound process broker 802, a synchronous outbound adapter 804, a business object 806 and an outbound proxy 808. The business object 806 may represent a plurality of business objects that implement the business logic of an application. The synchronous outbound process broker 802 may expose a coarse grained "self-contained" interface that contains logical methods, like createSalesOrder. Signature of the logical methods may be closely related to structures of business logic. Those methods may be called directly from the business logic with application specific request and response structures. For example, the business object 806 may call the outbound process broker 802 directly at any point of an active transaction when the business logic may determine as appropriate. The call may behave like a local method call. However, the called remote business logic may be executed in a separate LUW, even if it is deployed on the same Web Application Server (WAS) as the triggering business logic.

The synchronous outbound process broker 802 may be in charge of process integration such as, but not limited to, "if" and "what" need to be done for process integration. This may include determining actor/receiver, and process book-keeping. In one embodiment, the synchronous outbound process broker 802 may implement all integration relevant logic that is independent of protocol specifics.

The synchronous outbound adapter 804 may be responsible for protocol specifics. The synchronous outbound adapter 804 may be called by synchronous outbound process broker 802 using the exposed interface. All synchronous outbound adapters may also implement a coarse grained "self-contained" interface that defines logical methods, e.g. createSalesOrder. The synchronous outbound adapter 804 may read additional business logic relevant data from the business object 806 and may transform a message from an internal format to an external format. Once the transformation is completed, protocol specific proxies such as the outbound proxy 808 may be called by the synchronous outbound adapter 804 to pass the transformed message to remote system(s). Proxies may be provided for service/SOAP and RFC. In one embodiment, proxies may ensure type safety and hide complexity regarding protocol specific technical details.

In one embodiment, outbound process broker and adapter(s) may have to adhere to the standard contract of transactional integrity. For example, they may not perform immediate database updates. However, there may be exceptions that the outbound process broker and adapter(s) may update databases immediately for process logging, auditing, and or monitoring reasons.

In one embodiment, the business object 806 may be responsible for handling process integration errors. The outbound process broker 802 and adapter 804 may only have to detect communication and process integration errors, and signal them to the calling business logic (e.g., the business object 806). In another embodiment, an outbound process broker may decide whether an error can be tolerated from the perspective of the process integration case it is responsible for, and thus "hide" it from the business logic. Also note that if the business logic calls several synchronous outbound process integration steps that involve updates in the remote system(s), error handling in the business logic may becomes highly complicated and in this case, the asynchronous outbound communication may be used.

Figure 9:
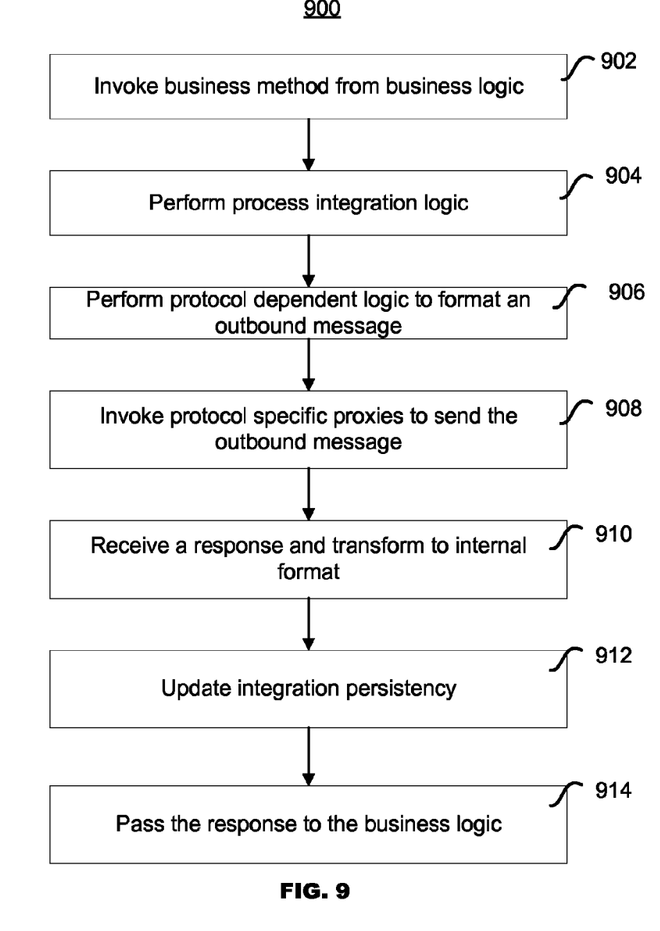
FIG. 9 illustrates a flow chart for synchronous outbound processing according to an exemplary embodiment.

FIG. 9 illustrates a flow chart 900 for synchronous outbound processing according to an exemplary embodiment. At block 902, a business method may be invoked by the business logic. The business logic may be a business object and the business method may be a method exposed by an outbound process broker handler. In one embodiment, the outbound process broker handler may be used as a factory to create an instance of relevant synchronous outbound process broker, so the business logic may directly call the relevant method of outbound process broker with corresponding request and response structures. At block 904, the outbound process broker may perform process integration logic. For example, the outbound process broker may determine actors (logical receiver) and technical receivers, and based on technical receivers may determine relevant adapters. During this process, the process broker handler may read configuration data for the specific system landscape. At block 906, an outbound adapter may be triggered to perform protocol dependent logic to format an outbound message. If message assembly required, additional data could be read. At block 908, the protocol specific proxies may be invoked to send the assembled message to remote system(s). At block 910, a response may be received and transformed to internal structure and transmitted to the synchronous outbound process broker. The synchronous outbound process broker may perform optional checks if necessary. At block 912, the process integration persistency may be updated in terms of process status information. At block 914, the response may be passed to business logic.

In one embodiment, the meta models of FIGS. 4, 6 and 8 and the communication processing illustrated by FIGS. 5, 7 and 9 may be implemented in a toolkit-generator approach. The inbound/outbound adapters may be responsible for the control flow while the process broker handlers may provide generic services (e.g., as a toolkit). The control flow orchestration may be uniformed by code generation (e.g., generator). The toolkit-generator approach for process integration may increase extensibility and flexibility of process integration by separation of business and integration logic, may harmonize development, configuration & monitoring for different channels (e.g. BAPI, IDOC, SOA). The toolkit-generator approach for process integration may also support evolution from point-to-point to middleware based mediated communication and may provide dedicated solution for synchronous & asynchronous communication. Further, the toolkit-generator approach for process integration may support model-based development, configuration & monitoring. Moreover, the toolkit-generator approach for process integration may have lean and simple core that can be extended on application demand, may reflect comprehensive concepts in application code not hidden in framework and may provide dedicated solution for error handling, extensibility, event handling, routing and mapping.

In one or more embodiments, the interfaces may be defined in an object oriented programming language (e.g., C++, Java, Advanced Business Application Programming (ABAP)). And the data objects implementing these interfaces, such as the process broker handler and adapters may be implemented in the object oriented programming language as well. In one embodiment, the adapters may also be referred to as backend adapters.

Figure 10:
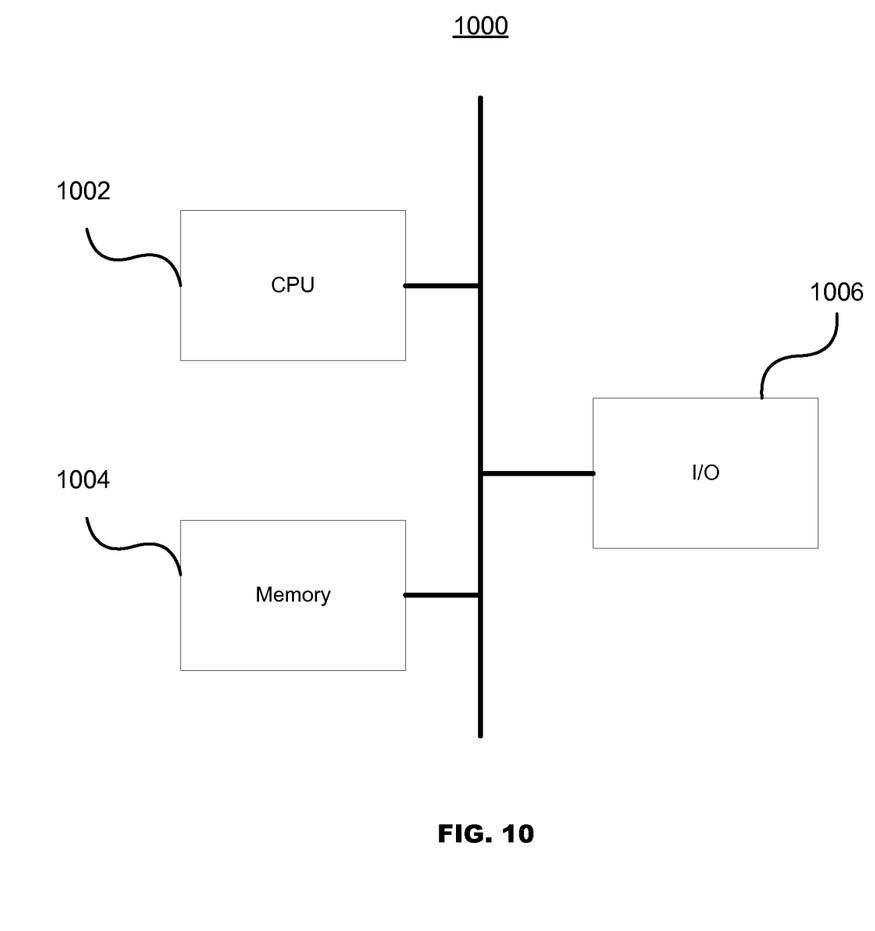
FIG. 10 depicts a structure of a computing device according to one embodiment of the invention.

FIG. 10 depicts a structure of a computing device 1000 according to one embodiment of the invention. The computing device 1000 may includes a processor 1002, memory 1004, and an I/O device(s) 1006. The processor 1002 is connected to the memory 1004 and I/O device(s) 1006. These connections are direct or via other internal electronic circuitry or components.

The processor 1002 is a programmable processor that executes instructions residing in the memory 1004 to receive and send data via the I/O device(s) 1006. The instructions may perform the operations of the application context and rule based UI control described herein. The term programmable processor as used herein is any programmable microprocessor or processor or combination of microprocessors or processors that can operate on digital data, which may be special or general purpose processors coupled to receive data and instructions from, and to transmit data and instructions to, a machine-readable medium. According to one embodiment of the present invention the processor 1002 may be an Intel® microprocessor or a mobile CPU.

Memory 1004 is a machine-readable medium that stores data that is processed by processor 1002. The term machine-readable medium as used herein is any addressable storage device that stores digital data including any computer program product, apparatus and/or device (e.g., a random access memory (RAM), read only memory (ROM), magnetic disc, optical disc, programmable logic device (PLD), tape, hard drives, RAID storage device, flash memory or any combination of these devices). This may include external machine-readable mediums that are connected to processor 1002 via one or more I/O device(s) 1006.

The I/O device(s) 1006 may include one or more input/output devices (e.g., a touch screen, a network adapter) and interfaces that receive and/or send digital data to and from an external device. Interfaces as used herein are any point of access to an external device where digital data is received or sent, including ports, buffers, queues, subsets thereof, or any other interface to an external device.

The exemplary method and computer program instructions may be embodied on a machine readable storage medium such as a computer disc, optically-readable media, magnetic media, hard drives, RAID storage device, and flash memory. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored on machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the sprit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A non-transitory computer-readable storage medium embodied with program instructions for causing a computer to execute a method for local process integration, the method comprising:

providing a business logic layer, wherein the business logic layer includes at least one business object and business logic associated with the at least one business object;

providing an inbound adapter that wraps an inbound process broker to expose the business logic via an inbound interface to external systems and receives inbound messages from the external systems, wherein the inbound messages adhere to the inbound interface;

providing the inbound process broker that processes the inbound messages based on the business logic;

providing an outbound process broker to communicate, in response to the processing of the inbound messages, with a remote process via an outbound adapter that implements an outbound interface, wherein the outbound interface includes the parameters required by the remote process; and providing a process broker handler to instantiate the inbound process broker, the inbound adapter, the outbound process broker, and the outbound adapter, wherein the process broker handler implements a plurality of process integration services including routing and mapping;

wherein for inbound communication, the inbound adapter is responsible for control flow and control flow orchestration is uniformed by code generation and wherein for outbound communication, the outbound process broker is responsible for control flow and control flow orchestration is uniformed by code generation.

2. The non-transitory computer-readable storage medium of claim 1, wherein for asynchronous outbound communication, the outbound process broker defines an execute method and registers interested events and the process broker handler listens to determine whether any interested event has occurred, when an interested event occurs, the process broker handler invokes the execute method of the outbound process broker, the outbound process broker invokes a logical method of the outbound adapter and performs error handling and process book-keeping.

3. The non-transitory computer-readable storage medium of claim 2, wherein the interested events include: a status attribute change event of the business object, and a save event of a transaction manager.

4. The non-transitory computer-readable storage medium of claim 1, wherein for synchronous outbound communication, the business object invokes a logical method of the outbound process broker with application specific request, the outbound process broker in turn invokes a logical method of the outbound adapter, the outbound adapter transforms the request to an external format.

5. The non-transitory computer-readable storage medium of claim 1, wherein for outbound communication, the outbound process broker is responsible for control flow and control flow orchestration is uniformed by code generation.

6. An apparatus for local process integration, comprising:
a memory to store computer program instructions; and
a processor configured to execute the computer program instructions to:
provide a business logic layer, wherein the business logic layer includes at least one business object and business logic associated with the at least one business object;

provide an inbound adapter that wraps an inbound process broker to expose the business logic via an inbound interface to external systems and receives inbound messages from the external systems, wherein the inbound messages adhere to the inbound interface;

provide the inbound process broker that processes the inbound messages based on the business logic;

provide an outbound process broker to communicate, in response to the processing of the inbound messages, with a remote process via an outbound adapter that implements an outbound interface, wherein the outbound interface includes the parameters required by the remote process;

and provide a process broker handler to instantiate the inbound process broker, the inbound adapter, the outbound process broker, and the outbound adapter, wherein the process broker handler implements a plurality of process integration services including routing and mapping;

wherein for inbound communication, the inbound adapter is responsible for control flow and control flow orchestration is uniformed by code generation and wherein for outbound communication, the outbound process broker is responsible for control flow and control flow orchestration is uniformed by code generation.

7. The apparatus of claim 6, wherein for asynchronous outbound communication, the outbound process broker defines an execute method and registers interested events and the process broker handler listens to determine whether any interested event has occurred, when an interested event occurs, the process broker handler invokes the execute method of the outbound process broker, the outbound process broker invokes a logical method of the outbound adapter and performs error handling and process book-keeping.

8. The apparatus of claim 7, wherein the interested events include: a status attribute change event of the business object, and a save event of a transaction manager.

9. The apparatus of claim 6, wherein for synchronous outbound communication, the business object invokes a logical method of the outbound process broker with application specific request, the outbound process broker in turn invokes a logical method of the outbound adapter, the outbound adapter transforms the request to an external format.

10. A computer implemented method for local process integration, the method comprising:

providing, by a computer processor, a business logic layer, wherein the business logic layer includes at least one business object and business logic associated with the at least one business object;

providing, by the computer processor, an inbound adapter that wraps an inbound process broker to expose the business logic via an inbound interface to external systems and receives inbound messages from the external systems, wherein the inbound messages adhere to the inbound interface;

providing, by the computer processor, the inbound process broker that processes the inbound messages based on the business logic;

providing, by the computer processor, an outbound process broker to communicate, in response to the processing of the inbound messages, with a remote process via an outbound adapter that implements an outbound interface, wherein the outbound interface includes the parameters required by the remote process; and providing, by the computer processor, a process broker handler to instantiate the inbound process broker, the inbound adapter, the outbound process broker, and the outbound adapter, wherein the process broker handler implements a plurality of process integration services including routing and mapping;

wherein for inbound communication, the inbound adapter is responsible for control flow and control flow orchestration is uniformed by code generation and wherein for outbound communication, the outbound process broker is responsible for control flow and control flow orchestration is uniformed by code generation.

11. The computer implemented method of 10, wherein for asynchronous outbound communication, the outbound process broker defines an execute method and registers interested events and the process broker handler listens to determine whether any interested event has occurred, when an interested event occurs, the process broker handler invokes the execute method of the outbound process broker, the outbound process broker invokes a logical method of the outbound adapter and performs error handling and process book-keeping.

12. The computer implemented method of claim 11, wherein the interested events include: a status attribute change event of the business object, and a save event of a transaction manager.

13. The computer implemented method of claim 10, wherein for synchronous outbound communication, the business object invokes a logical method of the outbound process broker with application specific request, the outbound process broker in turn invokes a logical method of the outbound adapter, the outbound adapter transforms the request to an external format.

* * * * *